US011202019B2

United States Patent
Nakajima

(10) Patent No.: US 11,202,019 B2
(45) Date of Patent: Dec. 14, 2021

(54) DISPLAY CONTROL APPARATUS WITH IMAGE RESIZING AND METHOD FOR CONTROLLING THE SAME

(71) Applicant: CANON KABUSHIKI KAISHA, Tokyo (JP)

(72) Inventor: Michinori Nakajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/994,385

(22) Filed: Aug. 14, 2020

(65) Prior Publication Data
US 2021/0058566 A1 Feb. 25, 2021

(30) Foreign Application Priority Data

Aug. 23, 2019 (JP) .............................. JP2019-152799

(51) Int. Cl.
*H04N 5/262* (2006.01)
*H04N 5/91* (2006.01)
*H04N 7/01* (2006.01)

(52) U.S. Cl.
CPC ............. *H04N 5/2628* (2013.01); *H04N 5/91* (2013.01); *H04N 7/0122* (2013.01)

(58) Field of Classification Search
CPC ....... H04N 5/2628; H04N 5/91; H04N 7/0122
See application file for complete search history.

(56) References Cited

U.S. PATENT DOCUMENTS

| 6,535,688 | B1* | 3/2003 | Kawamura | H04N 21/235 |
| | | | | 386/240 |
| 6,549,240 | B1* | 4/2003 | Reitmeier | H04N 7/0105 |
| | | | | 348/445 |
| 2009/0309988 | A1* | 12/2009 | Kubo | H04N 5/77 |
| | | | | 348/220.1 |
| 2018/0063445 | A1* | 3/2018 | Ogaki | H04N 5/2628 |
| 2018/0338091 | A1 | 11/2018 | Akimoto | |

FOREIGN PATENT DOCUMENTS

| CN | 101053253 A | 10/2007 |
| CN | 101144893 A | 3/2008 |
| CN | 106210253 A | 12/2016 |
| JP | 2016-116133 A | 6/2016 |
| JP | 2018-037859 A | 3/2018 |

\* cited by examiner

*Primary Examiner* — Michael E Teitelbaum
(74) *Attorney, Agent, or Firm* — Canon U.S.A., Inc. IP Division

(57) ABSTRACT

A display control apparatus is capable of acquiring first image data on a subject image formed at different magnifications in horizontal and vertical directions. The display control apparatus performs first resizing comprises applying first processing to obtain second data by clipping a part of the first image data and then generating a display image having a predetermined aspect ratio from the second data in a case where a moving image recording setting satisfies a predetermined condition. The display control apparatus performs second resizing including resizing the first image data without applying the first process in a case where the moving image recording setting does not satisfy the predetermined condition.

18 Claims, 9 Drawing Sheets

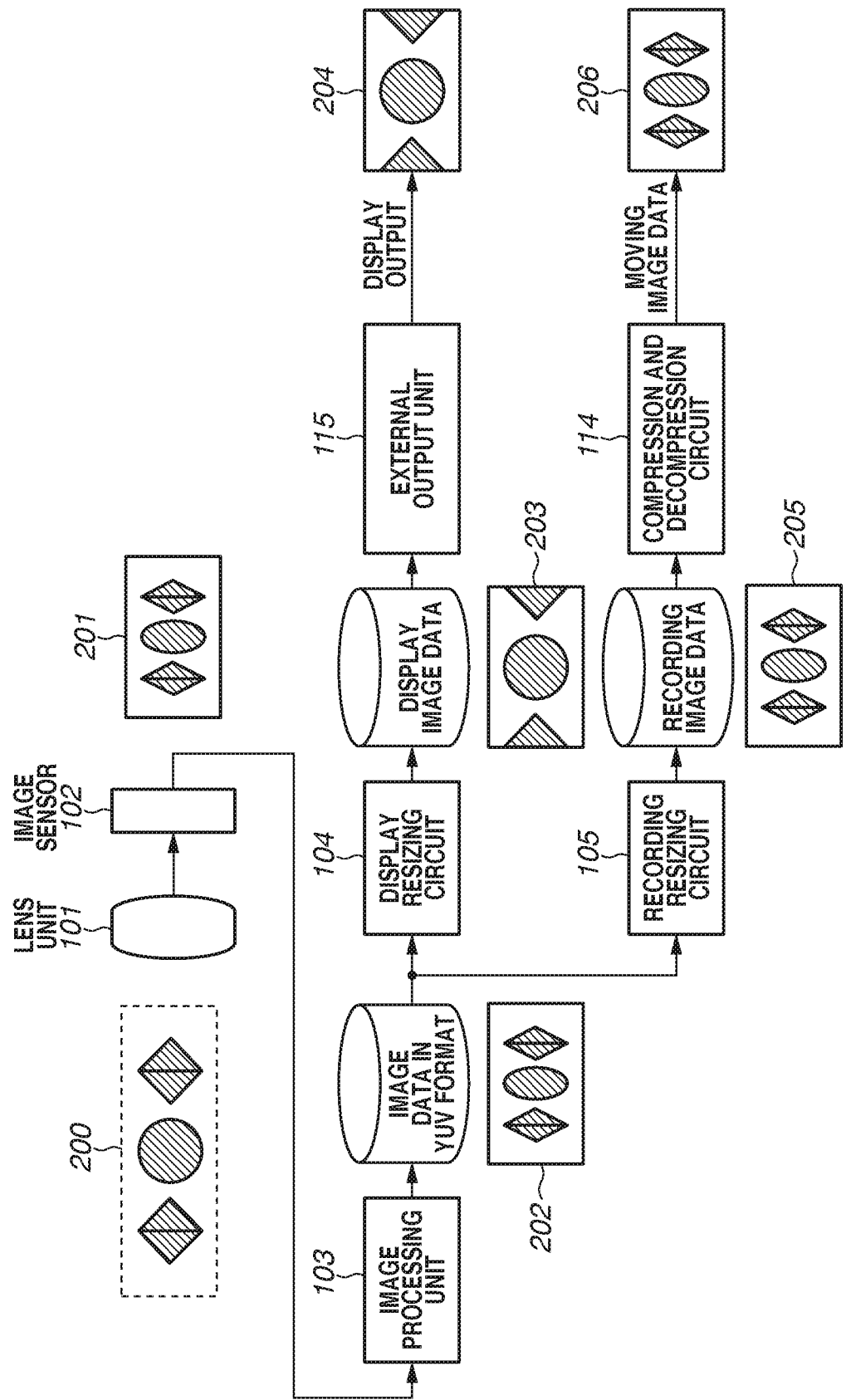

FIG.7A
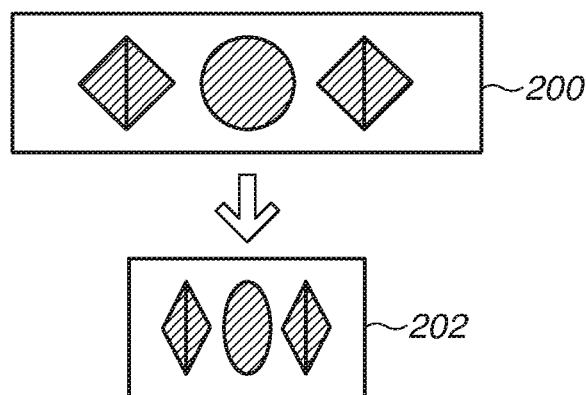
FIG.7B  FIG.7C  FIG.7D
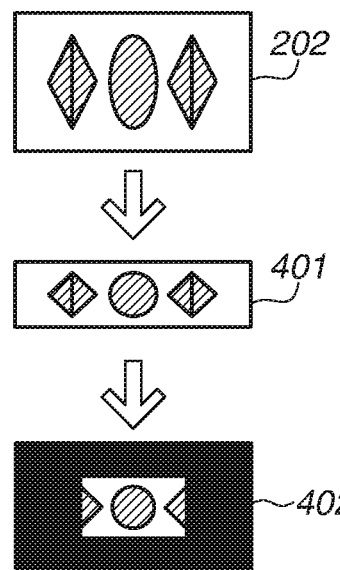 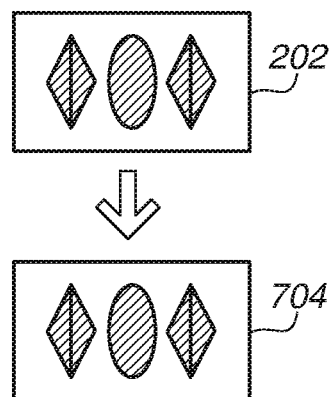 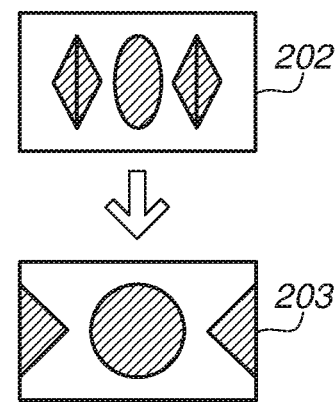

Magn AND ANAMORPHIC MODE

VERTICALLY REDUCED (NO MASKING ON RIGHT- AND LEFT-HAND SIDES)

DISPLAY CONTROL APPARATUS WITH IMAGE RESIZING AND METHOD FOR CONTROLLING THE SAME

BACKGROUND

Technical Field

One disclosed aspect of the embodiments relates to a technique for displaying an image captured using an anamorphic lens.

Description of the Related Art

An anamorphic lens is used during image capturing to acquire a horizontally compressed image. An image captured using an anamorphic lens is then post-processed to horizontally extend the image, whereby an image of a subject having an appearance closer to the original appearance can be acquired. According to a technique discussed in Japanese Patent Laid-Open No. 2018-37859, a part of a compressed image is clipped and the clipped image is scaled at different magnifications in the vertical and the horizontal directions. However, problems may arise when using this technique when changing a recording frame rate.

In a case where a part of an image captured using an anamorphic lens is scaled as discussed in Japanese Patent Laid-Open No. 2018-37859, time for inputting a captured image may differ from time for writing the image for display.

SUMMARY

In view of the above-described issues, one disclosed aspect of the embodiments is directed to provide a display control apparatus capable of displaying a captured image even in a case where a recording frame rate increases during moving image capturing using an anamorphic lens.

According to an aspect of the disclosure, a display control apparatus includes an acquisition unit, a display control unit, and a control unit. The acquisition unit is configured to acquire first image data that represents a subject image formed at different magnifications in a horizontal direction and a vertical direction. The display control unit is configured to perform first resizing and second resizing. The first resizing includes applying first processing to obtain second data by clipping a part of the first image data and then generating a display image having a predetermined aspect ratio from the second data. The second resizing includes resizing the first image data without applying the first process. The control unit is configured to control the display control unit to perform the first resizing in a case where a moving image recording setting satisfies a predetermined condition, and to perform the second resizing in a case where the moving image recording setting does not satisfy the predetermined condition.

According to another aspect of the disclosure, a method for controlling a display control apparatus includes acquiring first image data on a subject image formed at different magnifications in a horizontal direction and a vertical direction, resizing the first image data, and controlling the resizing. The resizing performs first resizing and second resizing. The first resizing includes applying first processing to obtain second data by clipping a part of the first image data and then generating a display image having a predetermined aspect ratio from the second data. The second resizing includes resizing the first image data without applying the first process. Controlling the resizing performs the first resizing in a case where a moving image recording setting satisfies a predetermined condition, and performs the second resizing in a case where the moving image recording setting does not satisfy the predetermined condition.

According to a further aspect of the disclosure, a non-transitory computer-readable storage medium stores a program for causing a computer of a display control apparatus to function as an acquisition unit, a display control unit, and a control unit. The acquisition unit is configured to acquire first image data that represents a subject image formed at different magnifications in a horizontal direction and a vertical direction. The display control unit is configured to perform first resizing and second resizing. The first resizing includes applying first processing to obtain second data by clipping a part of the first image data and then generating a display image having a predetermined aspect ratio from the second data. The second resizing includes resizing the first image data without applying the first process. The control unit is configured to control the display control unit to perform the first resizing in a case where a moving image recording setting satisfies a predetermined condition, and to perform the second resizing in a case where the moving image recording setting does not satisfy the predetermined condition.

Further features of the disclosure will become apparent from the following description of exemplary embodiments with reference to the attached drawings.

BRIEF DESCRIPTION OF THE DRAWINGS

FIG. 2 is a diagram illustrating an image data flow in first desqueeze processing according to the present exemplary embodiment.

FIGS. 7A to 7D are diagrams illustrating display examples according to the present exemplary embodiment.

DESCRIPTION OF THE EMBODIMENTS

An illustrative embodiment of the disclosure will be described below with reference to the accompanying drawings.

Figure 1A:
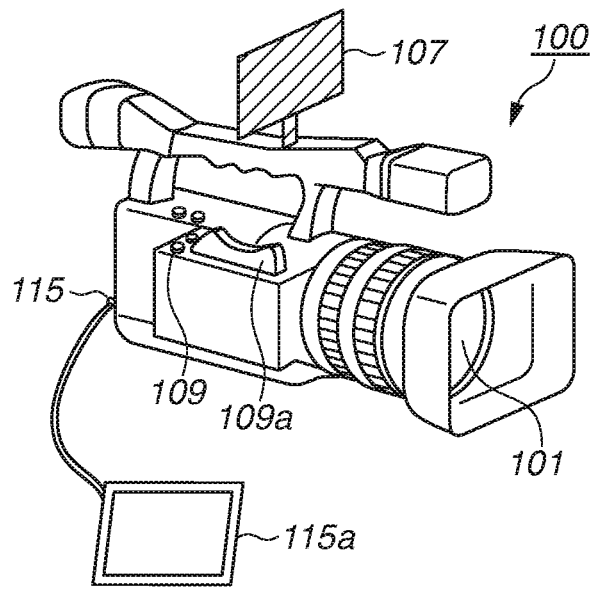
FIGS. 1A and 1B are diagrams illustrating a configuration of a video camera according to the present exemplary embodiment.

FIG. 1A illustrates an example of an outer appearance of a video camera 100 as an example of a display control apparatus of the disclosure.

The video camera 100 includes a lens unit 101 on the front, a user operation unit 109 (hereinafter referred to as an operation unit 109) on the side, and a panel 107 on the top.

The panel 107 is detachable from the main body of the video camera 100. An external output unit 115 has a terminal, not detachable from the video camera 100, for connecting to a display unit. The external output unit 115 is, for example, a High-Definition Multimedia Interface (HDMI®) or a Serial Digital Interface (SDI). The operation unit 109 is an operation member having a seesaw-shaped grip zoom 109a (zoom key) and various switches and buttons for receiving various operations from the user. The operation unit 109 is provided with a power switch for turning power ON and OFF, a menu button for displaying a menu screen, and a mode change switch for changing an operation mode. The mode change switch changes the operation mode of the video camera 100 between a still image recording mode, a moving image capture mode, and a reproduction mode.

Figure 1B:
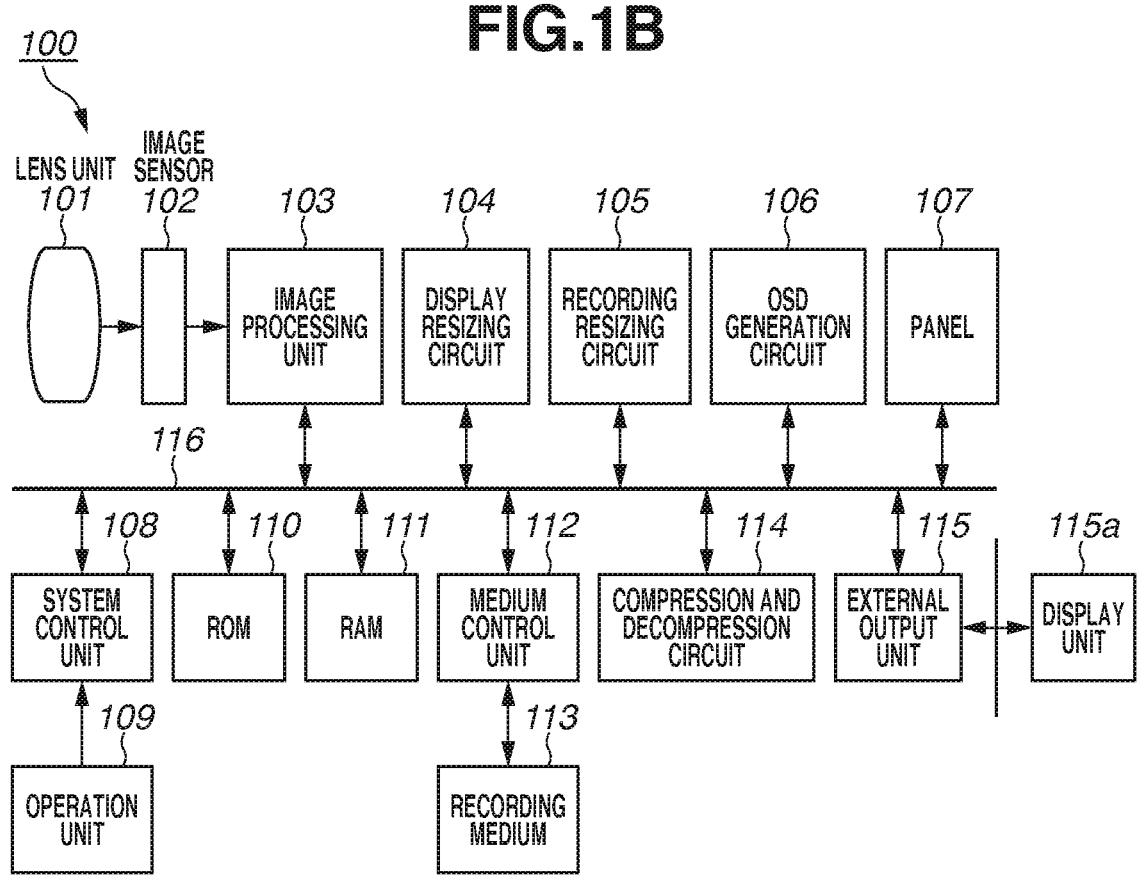

FIG. 1B is a block diagram illustrating the video camera 100 according to the present exemplary embodiment. The lens unit 101 includes a fixed lens group for condensing light, a variable power lens group, a diaphragm, and a correction lens group having a function of correcting the image forming position that has moved by the movement of the variable power lens group and a function of performing focus adjustment. The lens unit 101 forms a subject image on the imaging plane of an image sensor 102 (described below). The lens unit 101 is a component included in an interchangeable lens attachable to a lens attachment unit. An attached interchangeable lens does not necessarily include the above-described lens groups. An anamorphic lens (having a X2 compression ratio) can be attached to the lens attachment unit. The anamorphic lens optically reduces (or squeezes) a subject image formed on the image sensor 102 by half in the horizontal direction. An anamorphic lens (having a 1.3-time compression ratio) can be attached to the lens attachment unit. The anamorphic lens optically reduces (or squeezes) a subject image by 1/1.3 in the horizontal direction. More specifically, the subject image is optically formed in a horizontally compressed state with respect to the vertical direction.

When a subject having a circular form is captured using an anamorphic lens, the captured subject image is optically compressed (or squeezed) in the horizontal direction. Therefore, the subject image is formed on the image sensor 102 in a vertically oblong elliptic form and captured. While the subject is displayed in a vertically oblong elliptic form when the subject image is displayed without any processing, the subject image is restored to a circular form by desqueeze processing which is performed before display. The present exemplary embodiment will be described below centering on desqueeze display in a case where an anamorphic lens having a X2 compression ratio is attached on the video camera 100. In a case where an anamorphic lens having other magnification is attached, the clipping range and the desqueeze magnification may be changed. Since distortion of the anamorphic lens is largely different between the center and both ends of the image, distortion may occur in the image in a case where image data acquired using an anamorphic lens is simply horizontally extended. Therefore, clipping the central area having less distortion or displaying black belts in the right- and left-hand sides' areas (belt-like display) is performed to display an image that is easy to be viewed for the user.

The image sensor 102 converts light into charges to generate an imaging signal. The generated imaging signal is output to an image processing unit 103. The image sensor 102 is an imaging element, such as a charge coupled device (CCD) image sensor or a complementary metal oxide semiconductor (CMOS) image sensor. An image sensor in which each of all pixels on the imaging plane includes a pair of light-sensitive elements, what is called the dual pixel type, is also applicable. In an image sensor of this type, each pixel is capable of photoelectrically converting a pair of optical images formed by a micro lens using the pair of light-sensitive elements.

The image processing unit 103 converts an imaging signal input from the image sensor 102 into RAW data (RAW image). Then, the image processing unit 103 performs RAW development processing, such as interpolation processing and image quality adjustment processing, on the RAW data to generate YUV format image data corresponding to the RAW data and stores the image data in a random access memory (RAM) 111.

A display resizing circuit 104 performs resizing processing and desqueeze processing (described below) on the YUV format image data stored in the RAM 111 to generate display image data and stores the display image data in the RAM 111.

A recording resizing circuit 105 performs resizing processing on the YUV format image data stored in the RAM 111 to generate recording image data and stores the recording image data in the RAM 111.

A bus 116 is a data bus for enabling the blocks of the video camera 100 to exchange data with each other. The blocks of the video camera 100 exchange data with each other via the bus 116.

An on-screen display (OSD) generation circuit 106 stores OSD data, such as various setting menus, titles, and time, in the RAM 111. The stored OSD data is combined with the display image data stored in the RAM 111. The combined data is displayed on the panel 107 as a display unit and output to the outside via the external output unit 115.

The panel 107 is a display panel, such as a liquid crystal panel and an organic electroluminescence (EL) panel. The panel 107 displays display image data and OSD data.

A system control unit 108 controls the entire video camera 100. The system control unit 108 may include a processor or a programmable device that executes a set of instructions or program to perform operations described in the following.

The operation unit 109 is used by the user to input an operation. The operation unit 109 is provided with a switch for selecting a mode from among a camera mode mainly performing image capturing, a reproduction mode for mainly reproducing an image, and a power off mode for turning power OFF. The grip zoom 109a is a zoom key for changing the display magnification of a captured image.

Figure 6:
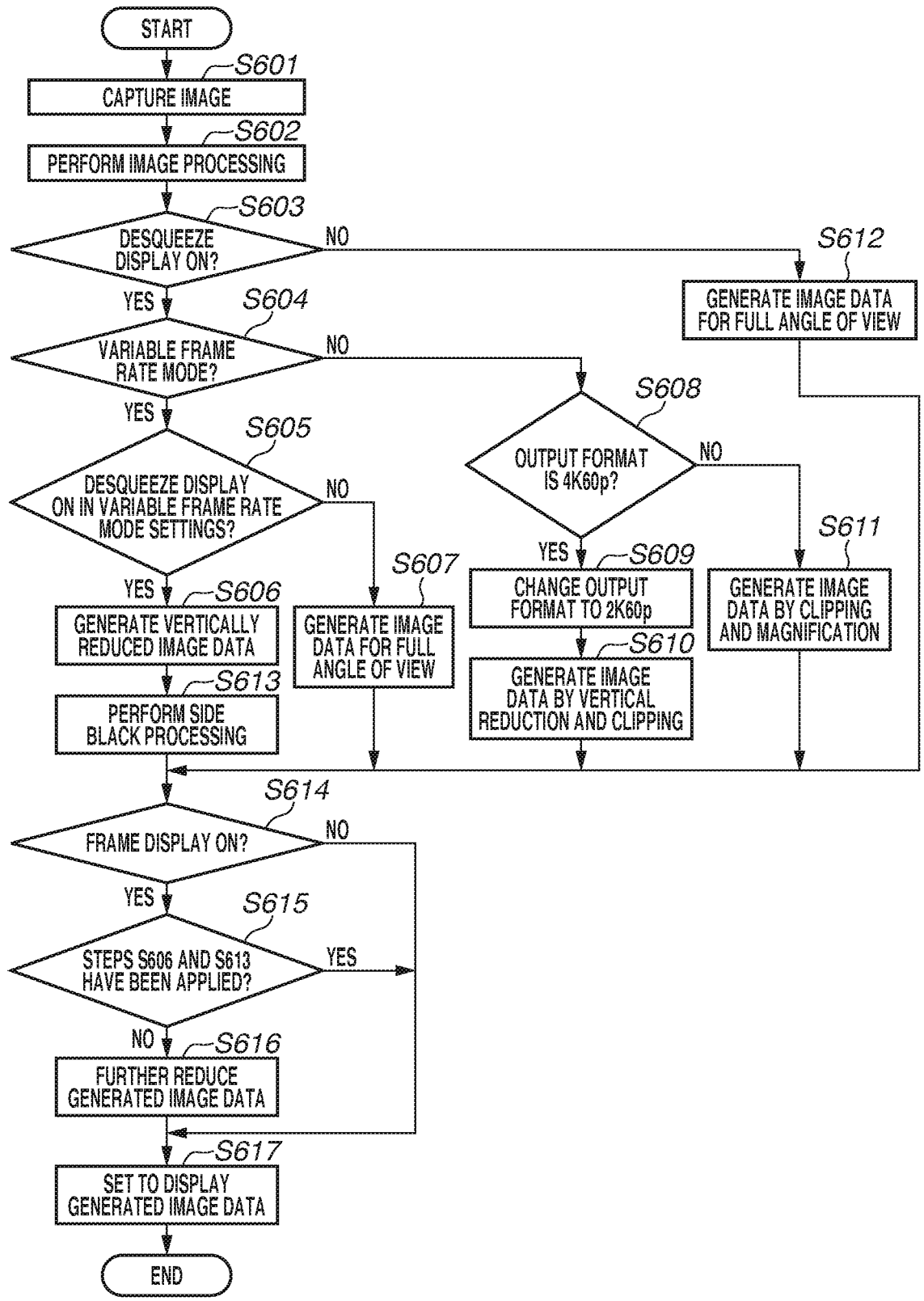
FIG. 6 is a flowchart illustrating display processing according to the present exemplary embodiment.

A read only memory (ROM) 110 is a nonvolatile recording medium storing a program that is executed by the system control unit 108 to perform operations described in the following such as FIG. 6. The ROM 110 includes, for example, a Flash ROM. Alternatively, program data stored in a recording medium 113 may be loaded into the RAM 111 for use as a ROM. The area in the ROM 110 is partly used for backup to maintain system statuses.

The RAM 111 is a volatile memory that is used by the system control unit 108 as a work area. The RAM 111 is also used by the image processing unit 103, and a compression and decompression circuit 114 as a work area.

A medium control unit 112 records moving image data, which is generated by the compression and decompression circuit 114 and output to the RAM 111, in the recording medium 113 according to a computer-compatible format, such as the File Allocation Table (FAT) file system. The recording medium 113 is detachable from the video camera 100, and is attachable to a personal computer (PC) in addition to the video camera 100.

The compression and decompression circuit 114 performs Moving Picture Experts Group (MPEG) compression (encoding) on the image data stored in the RAM 111 to generate moving image data and outputs the moving image data to the RAM 111.

The external output unit 115 is an external output unit, such as an HDMI and SDI. The external output unit 115 outputs the display image data, output to the RAM 111 by the image processing unit 103, to an external display unit 115a, for example. The external output unit 115 can output display image data using 4K60P and 2K60P signals, for example.

First desqueeze processing according to the present exemplary embodiment will be described below with reference to FIGS. 2 and 3.

FIG. 2 illustrates an image data flow diagram from image capturing by the video camera 100 to image display or recording. The description will be given on the premise that the lens unit 101 is an anamorphic lens having a compression ratio of 1:2 (vertical to horizontal directions).

An image of a subject 200 is captured by the video camera 100. The captured image of the subject 200 is formed on the image sensor 102 as an image 201 which is compressed at an aspect ratio of 1:2 by the lens unit 101. An imaging signal photoelectrically converted from the formed image is input to the image processing unit 103 and stored as image data 202 in the YUV format in the RAM 111. On the image data 202 in the YUV format stored in the RAM 111, first desqueeze processing (described below) is performed by the display resizing circuit 104 and the resultant data is stored as display image data 203 in the RAM 111. The stored display image data 203 is output to the outside using, for example, an HDMI terminal, via the external output unit 115 and then displayed as an image 204.

The image data 202 in the YUV format is input to the compression and decompression circuit 114 as recording image data 205 that has been resized to a recording size by the recording resizing circuit 105. The recording image data 205 is compressed by the compression and decompression circuit 114 and recorded in the recording medium 113 via the medium control unit 112 as moving image data 206.

Figure 3:
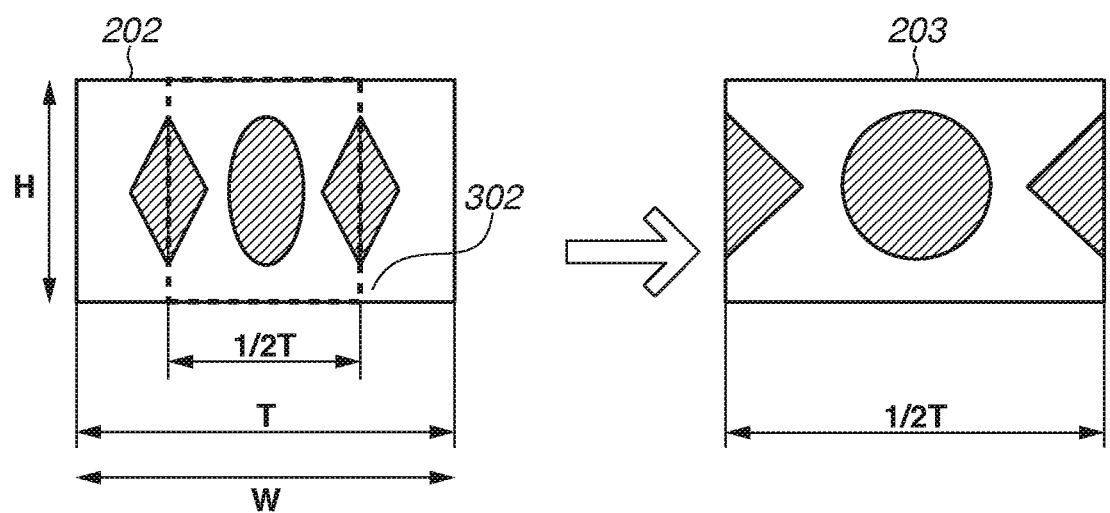
FIG. 3 is a diagram illustrating display control in the first desqueeze processing according to the present exemplary embodiment.

FIG. 3 illustrates the first desqueeze processing performed by the display resizing circuit 104.

The left-hand side of FIG. 3 illustrates an example of the image data 202 in the YUV format (acquired by the display resizing circuit 104) to be input to the display resizing circuit 104.

The description will be given on the premise that the image data 202 in the YUV format has a width W and a height H. The display resizing circuit 104 clips a clipping range 302, which is a range from ¼ to ¾ of the width of the image data 202 from the left-hand side and a height H, and performs the scaling processing at different magnifications in the vertical and the horizontal directions. By the scaling processing in which a horizontal magnification (magnification ratio in width) is twice the vertical magnification (magnification ratio in height), the resultant display image is horizontally extended twice in comparison with a display image of a case where the original image 201 is displayed without the scaling processing. The subject image horizontally compressed by the lens unit 101 in comparison with the actual appearance of the subject is horizontally extended twice, and consequently, the subject image is restored to the original appearance of the subject. Desqueeze processing using the horizontal magnification ratio twice the vertical magnification ratio in this way is referred to as first desqueeze processing (first resizing). The image data generated in the first desqueeze processing is like the display image data 203 illustrated in on the right-hand side of FIG. 3. By the first desqueeze processing, the display image data 203 is generated using a half of the width of the image data 202 in the YUV format input to the display resizing circuit 104. This is because, according to the present exemplary embodiment, the horizontal compression magnification by the lens unit 101 is X2. However, the size of the clipping range 302 is not limited thereto for other magnifications. The image data 202 in the YUV format is horizontally scanned and input to the display resizing circuit 104 on a line basis. When one line of the width W is input to the display resizing circuit 104 in the input time period T, the clipping range 302 is input in an input time period ½*T. Therefore, the time for writing one line of the display image data 203 needs to be ½*T or less.

When time for generating display image data is longer than input time, the following issues may arise: a time period from the imaging timing to the display timing is prolonged, a captured image for each frame is not to be displayed, and incomplete display image data is output. Therefore, it is necessary to generate one line of the display image data 203 in the time period ½*T. Since performance of the display resizing circuit 104 is limited, when a time usable for generating display image data (i.e., the time period ½*T) is shortened, generation of the display image data 203 may be not completed in time.

The time period T depends on the frame rate of the video camera 100. More specifically, time usable for resizing processing decreases with increase in frame rate, and consequently, display processing may not be completed in time.

Figure 4:
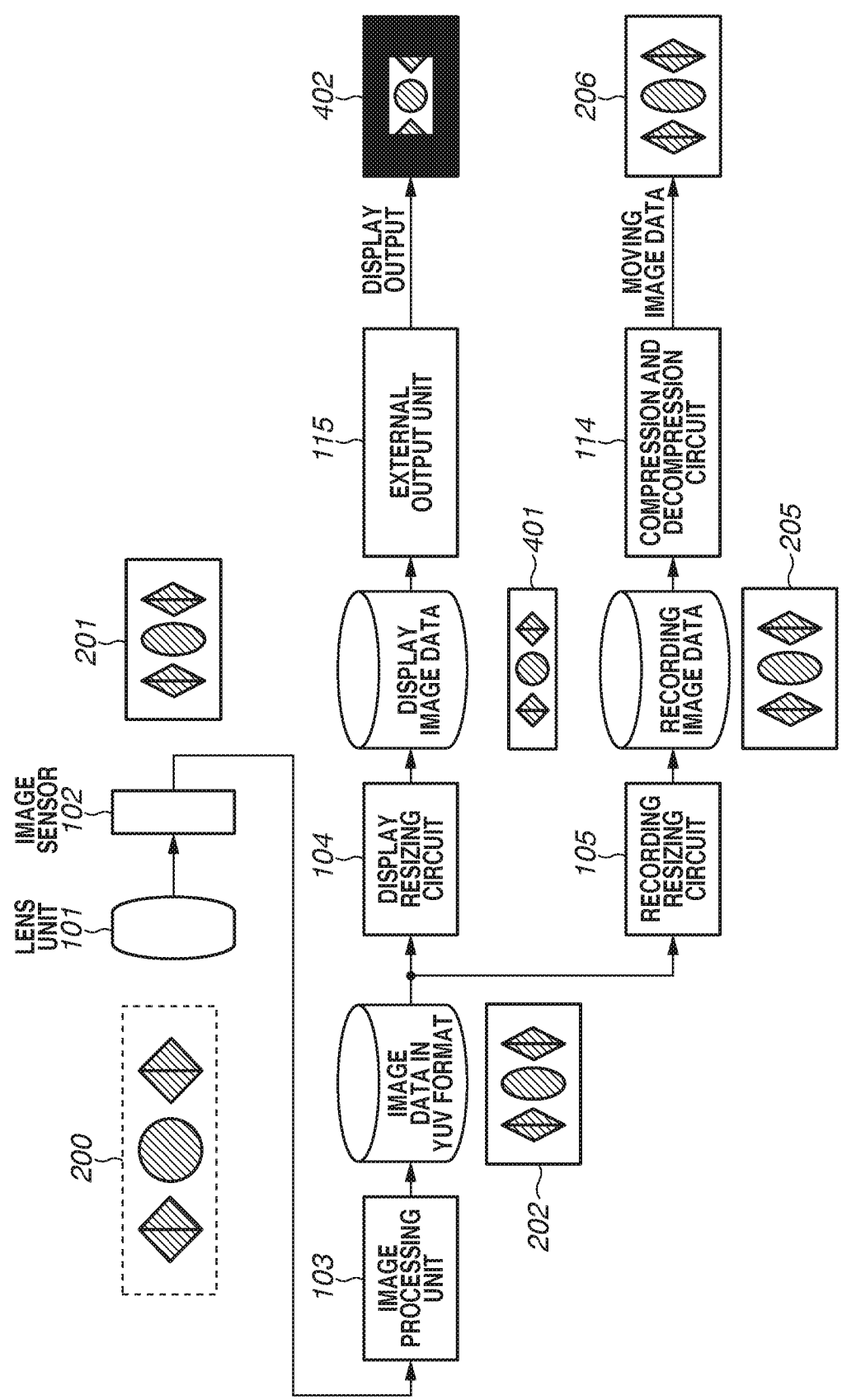
FIG. 4 is a diagram illustrating an image data procedure in second desqueeze processing according to the present exemplary embodiment.

Second desqueeze processing will be described below with reference to FIG. 4. The image data flow diagram from image capturing by the video camera 100 to input to the display resizing circuit 104 is similar to that illustrated FIG. 2, and redundant description thereof will be omitted.

On the image data 202 in the YUV format stored in the RAM 111, the display resizing circuit 104 performs second desqueeze processing or second resizing (described below) and the resultant image data is stored as display image data 401 in the RAM 111. The stored display image data 401 has black belts arranged at the upper and lower portions and output to the outside via the external output unit 115 such as an HDMI, whereby the image 402 is displayed.

Similar to the flow diagram illustrated in FIG. 2, the image data 202 in the YUV format is input to the compression and decompression circuit 114 as recording image data 205 resized to a recording size by the recording resizing circuit 105. Then, the recording image data 205 is compressed by the compression and decompression circuit 114 and recorded as moving image data 206 in the recording medium 113 via the medium control unit 112.

Figure 5:
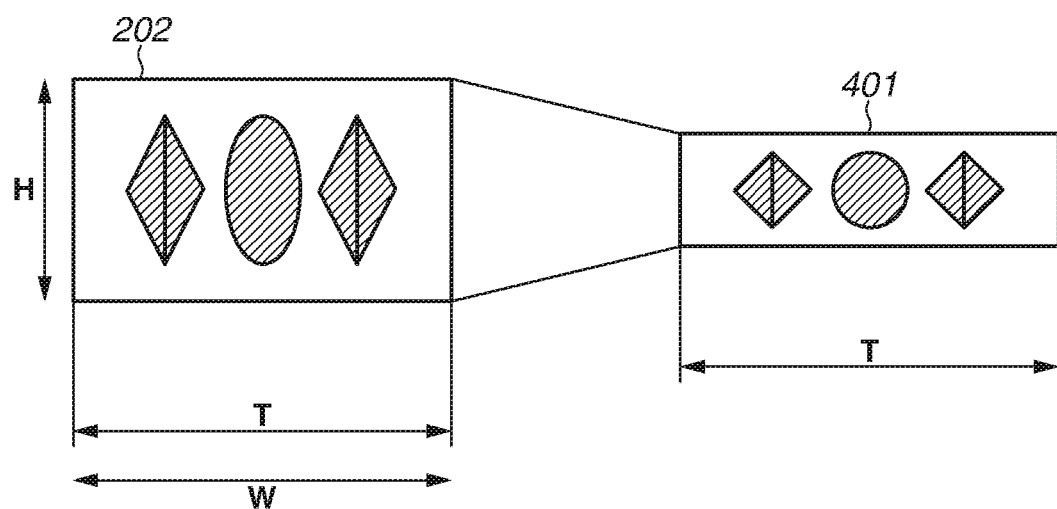
FIG. 5 is a diagram illustrating display control in the second desqueeze processing according to the present exemplary embodiment.

The second desqueeze processing will be described below with reference to FIG. 5. FIG. 5 is a diagram illustrating the second desqueeze processing that is performed by the display resizing circuit 104.

The left-hand side of FIG. 5 illustrates an example of the image data 202 in the YUV format that is input to the display resizing circuit 104. Similar to FIG. 3, the description will be given on the premise that the image data 202 in the YUV format has a width W and a height H. The display resizing circuit 104 performs the desqueeze processing on a range of the width W and the height H of the image data 202 in the YUV format. In this processing, scaling is performed at different magnifications in the vertical and the horizontal directions. Unlike the first desqueeze processing illustrated in FIGS. 3 and 4, the vertical magnification ratio is a half of the horizontal magnification ratio in the second desqueeze processing. By the scaling at a vertical magnification (magnification ratio in height) that is a half of the horizontal magnification (magnification ratio in width), the resultant display image is vertically compressed in comparison with a display image of a case where the original image 201 displayed without the scaling processing. Accordingly, the subject image which is horizontally compressed by the lens unit 101 in comparison with the actual appearance of the subject is vertically compressed by half. As a result, the subject image is restored to the original appearance of the subject. The above-described method for causing the horizontally compressed subject image to be the original appearance of the subject by vertically compressing the input image without horizontally clipping the input image (without horizontally clipping the image data in the YUV format) is referred to as the second desqueeze processing. The generated image data by this processing is the display image data 401 illustrated on the right-hand side of FIG. 5. Since the image data 202 in the YUV format and the display image data 401 are not horizontally clipped, the input time period T during which one line is input to the display resizing circuit 104 becomes available for time for writing one line of the display image data 401. In an example case where a line for 1920 pixels is input in the time period T, and in a case where the first desqueeze processing is performed, display data for 1920 pixels needs to be written in the time period ½*T since a half of the image data is clipped. On the other hand, by the second desqueeze processing, in a case where one line for 1920 pixels is input in the input time period T, the time period T becomes available for writing the display data.

However, the size of the display image after the second desqueeze processing is smaller than that after the first desqueeze processing. Therefore, in terms of the user requiring large image display, the first desqueeze processing has image visibility higher than that of the second desqueeze processing.

The display image data 401 is not displayed as it is. The display image data 401 is supplied with black belts at the upper and lower portions (side black processing) as illustrated in FIG. 4, i.e., the image 402 is displayed.

Display processing according to the present exemplary embodiment will be described below with reference to FIG. 6. Each piece of processing in the flowchart illustrated in FIG. 6 is implemented when the system control unit 108 configuring the video camera 100 executes a program stored in the RAM 111. In step S601, the system control unit 108 controls the image sensor 102 to capture the image by photoelectrically converting the image of the subject 200 formed on the image sensor 102 via the lens unit 101 to generate an imaging signal, and inputting the imaging signal to the image processing unit 103. In this processing, the image 201 as the subject image acquired via the lens unit 101 is horizontally compressed in comparison with the actual appearance of the subject.

In step S602, the system control unit 108 controls the image processing unit 103 so as to perform image processing, this includes converting the imaging signal into RAW data (RAW image). Then, the image processing unit 103 performs RAW development processing, such as interpolation processing and image quality adjustment processing, on the RAW data to generate the image data 202 in the YUV format corresponding to the RAW data, and stores the image data 202 in the RAM 111. FIG. 7A illustrates the subject 200 of which image is captured by the video camera 100 and the image data 202 in the YUV format. By the lens unit 101, an image of the subject 200 is captured as horizontally compressed image data.

In step S603, the system control unit 108 determines whether a desqueeze display of the video camera 100 is ON or OFF. If the desqueeze display is ON, desqueeze processing (first desqueeze processing or second desqueeze processing) is performed. On the other hand, if the desqueeze display is OFF, the desqueeze processing is not performed. The user can set the desqueeze display to be ON or OFF by operating the operation unit 109 based on menu information displayed on the panel 107. In a case where the system control unit 108 determines that the desqueeze display is ON (YES in step S603), the processing proceeds to step S604. On the other hand, in a case where the system control unit 108 determines that the desqueeze display is OFF (NO in step S603), the processing proceeds to step S612.

In step S604, the system control unit 108 determines whether the video camera 100 is in an imaging setting variable frame rate mode. The variable frame rate mode is a shooting mode in which the user can change the imaging frame rate of the video camera 100 by using the operation unit 109. For example, in a case where the user sets 120 fps, the video camera 100 captures a moving image at 120 fps. In a case where the user sets 30 fps, the video camera 100 captures a moving image at 30 fps. The variable frame rate mode also enables the user to change the reproduction speed at reproducing an image. In this way, the variable frame rate mode enables the user to record a moving image in a slow mode and intermittently record time-sequential changes (fast recording), such as nature observation (both recording modes are collectively referred to as Slow & Fast Motion). In a case where the system control unit 108 determines that the video camera 100 is in the variable frame rate mode (YES in step S604), the processing proceeds to step S605. On the other hand, in a case where the system control unit 108 determines that the video camera 100 is not in the variable frame rate mode (NO in step S604), the processing proceeds to step S608. In the variable frame rate mode, increase in the frame rate setting may cause failure of completion of the above-described first desqueeze processing in time at frame rates above a certain frame rate.

In step S605, the system control unit 108 determines whether the desqueeze display is ON or OFF in the variable frame rate mode settings in the video camera 100. The user can set the desqueeze display to be ON or OFF in the variable frame rate mode settings by operating the operation unit 109 based on the menu information displayed on the panel 107. In a case where the system control unit 108 determines that the desqueeze display is ON in the variable frame rate mode settings (YES in step S605), the processing proceeds to step S606. On the other hand, in a case where the system control unit 108 determines that the desqueeze display is OFF (NO in step S605), the processing proceeds to step S607. While the system control unit 108 determines whether the recording setting is the variable frame rate mode in step S605, the processing is not limited thereto. The system control unit 108 may make the YES determination in step S605 in a case where a predetermined condition is satisfied (e.g., the recording frame rate of a moving image or the resolution of a moving image is more than or equal to a predetermined value).

In steps S606 and S613, the system control unit 108 performs processing for the display illustrated in FIG. 7B.

In step S606, the system control unit 108 performs the second desqueeze processing to generate the display image data 401. This may include generating vertically reduced image data.

In step S613, the system control unit 108 controls the display resizing circuit 104 to perform the side black processing on the display image data 401 generated in step S606 to generate the image 402, and displays the image 402. The side black processing is performed to adjust the angle of view to the display image data 203 processed by the first desqueeze processing. In a case where the user sets to display an image with the aspect ratio of the cinema scope, clipping is performed to obtain the aspect ratio of the cinema scope in the first desqueeze processing, and the image is displayed. More specifically, as a result of resizing, clipping is performed to obtain the aspect ratio of the cinema scope. On the other hand, in the second desqueeze processing, the display image data 401 includes regions out of the range displayed in the first desqueeze processing. The aspect ratio of the display image data 401 is also different from that of the display image data 203 obtained by the first desqueeze processing. Therefore, in step S613, the system control unit 108 performs display processing for arranging side black belts to the right- and left-hand sides of the display image data 401, so that the display unit 115a can display an image with the aspect ratio set by the user, i.e., the aspect ratio of the cinema scope. In step S613, the system control unit 108 turns ON a reduction desqueeze flag indicating that vertical reduction processing and the side black processing have been performed. In a case where the frame rate is low in the variable frame rate mode, the display processing may be completed in time even when the first desqueeze processing is performed. Therefore, the system control unit 108 may perform the second desqueeze processing in a case where the frame rate is greater than a threshold value, and perform the first desqueeze in a case where the frame rate is less than the threshold value. However, in a case where the display for the first desqueeze processing and the display for the second desqueeze processing are changed because of a change in the frame rate mode performed by the user in the same shooting mode, the image visibility will change in the same shooting mode. Therefore, in the variable frame rate mode, the system control unit 108 performs the second desqueeze processing when desqueeze display is set, regardless of the setting of the frame rate setting. This enables stable image display without frequent changes in size of the image displayed for checking by the user. While the present exemplary embodiment has been described above centering on the use of the aspect ratio of the cinema scope, the aspect ratio is not limited thereto, and may be other values such as 4:3 and 16:9.

In step S607, the system control unit 108 controls the display resizing circuit 104 to generate display image data based on the image data 202 in the YUV format for full angle of view. As illustrated in FIG. 7C, this resizing processing generates display image data 704 without converting the aspect ratio.

The processing in steps S608 to S610, which is display processing for a high image resolution, not in the variable frame rate mode, will be described below.

In step S608, the system control unit 108 determines whether the external output unit 115 outputs image data having the 4K image resolution and the 60 p (fps) display frame rate. In a case where the external output unit 115 outputs image data having the 4K image resolution and the 60-p display frame rate (YES in step S608), the processing proceeds to step S609. On the other hand, in a case where the external output unit 115 does not output image data having the 4K image resolution and the 60-p display frame rate (NO in step S608), the processing proceeds to step S611. The output setting for the external output unit 115 may be set by the user or forcibly set based on the display performance of the display unit 115a. The image resolution and the display frame rate as the references for the determination in step S608 are based on the performance of the video camera 100, and are not limited to 4K and 60 p, respectively, according to the present exemplary embodiment. For example, the image resolution may be 8K or 16K, and the display frame rate may be 120 p. Down-conversion (described below) is not limited to the 2K image resolution and the 60-p display frame rate.

In step S609, the system control unit 108 controls the external output unit 115 to change the output format to the 2K image resolution and the 60-fps display frame rate (i.e., "2K60p").

In step S610, the system control unit 108 controls the display resizing circuit 104 to perform vertical reduction on the image data 202 in the YUV format, and clips the central part of the image data 202 to generate display image data. The generation of display image data in step S610 will be described below with reference to FIGS. 8A to 8C.

Figure 8A:
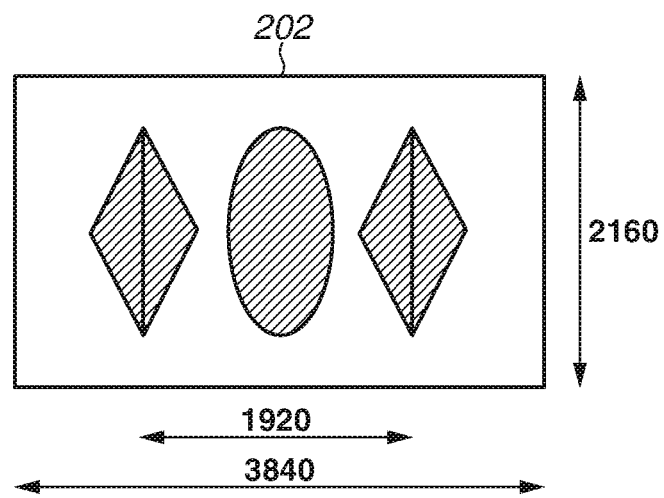
FIGS. 8A to 8C are diagrams illustrating display in a case where an output format is 4K resolution at 60 frames per second (fps) according to the present exemplary embodiment.
Figure 8B:
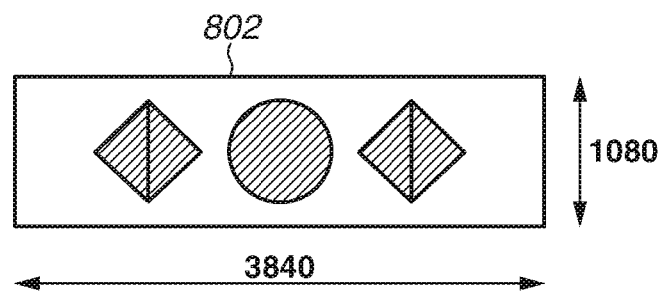
Figure 8C:
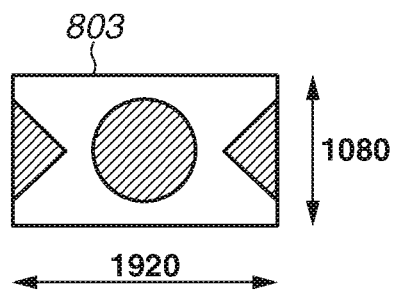

FIG. 8A illustrates the image data 202 in the YUV format which is input to the display resizing circuit 104. The system control unit 108 vertically compresses the image data 202 in the YUV format by half using the display resizing circuit 104. FIG. 8B illustrates display image data 802 as a result of vertically compressing which has been performed on the image data 202 in the YUV format. When the size of the image data 202 in the YUV format is 3840 in width and 2160 in height, the size of the display image data 802 is 3840 in width and 1080 in height, as illustrated in FIG. 8B. As illustrated in FIG. 8C, the system control unit 108 further clips the central part of the display image data 802 to generate display image data 803. The size of the display image data 803 is 1920 in width and 1080 in height. More specifically, the system control unit 108 down-converts the image data having the 4K image resolution illustrated in FIG. 8A into image data having the 2K image resolution.

In step S611, the system control unit 108 performs the first desqueeze processing. This may be performed by generating image data by clipping and magnification. More specifically, in a case where the user sets the setting for the desqueeze display, the system control unit 108 performs the second desqueeze processing in the variable frame rate mode and performs the first desqueeze processing in other than the variable frame rate mode. FIG. 7D illustrates the display image data 203 to be generated in step S611.

In step S612, similar to step S607, the system control unit 108 controls the display resizing circuit 104 to generate display image data based on the image data 202 in the YUV format for full angle of view.

Figure 9A:
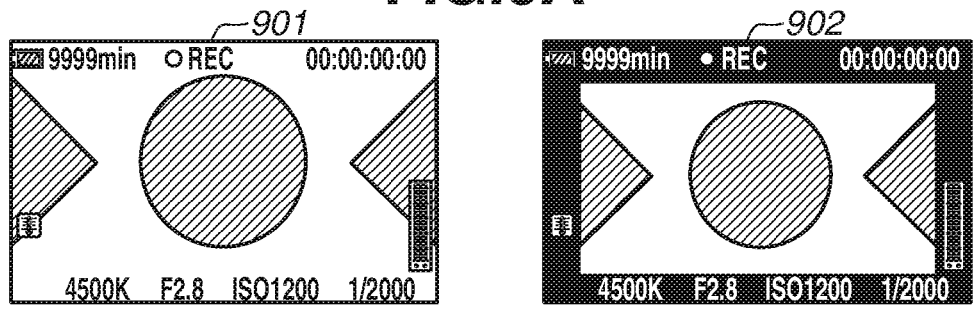
FIGS. 9A to 9D are diagrams illustrating frame display according to the present exemplary embodiment.

In step S614, the system control unit 108 determines whether a frame display of the video camera 100 is ON or OFF. Frame display (surround display) will be described below with reference to FIGS. 9A to 9D. The frame display refers to a setting for legibly displaying pieces of imaging information, such as the recording time, remaining amount of power, and International Organization for Standardization (ISO) speed, along the four sides of the display unit 115a (or the panel 107) around the captured image. FIGS. 9A to 9D illustrate examples of frame display. Referring to FIG. 9A, an image 901 indicates the image of a case where a frame display is OFF, and an image 902 indicates the image of a case where the frame display is ON. Referring to the image 902 having a display image size smaller than the image 901, information is displayed in belt-like areas around the image (along the four sides of the display unit 115a). This prevents the image and information from being displayed in a superimposed way. While, in the image 902, black belt-like areas are provided and white characters are displayed on the black background, the display format of the frame is not limited thereto. Black characters may be displayed on the white or gray background.

To display the image 901 on the display unit 115a, the system control unit 108 combines the OSD data stored in the RAM 111 with the display image data and outputs the combined image to the external output unit 115. To display the image 902, the system control unit 108 combines the OSD data stored in the RAM 111 with the display image data reduced for frame display and arranges the OSD data around the display image data. The user can change the frame display to be ON or OFF by a menu operation. In a case where the frame display is ON (YES in step S614), the processing proceeds to step S615. On the other hand, in a case where the frame display is OFF (NO in step S614), the processing proceeds to step S617. In step S615, the system control unit 108 determines whether steps S606 and S613 have been applied, i.e., whether the desqueeze flag is ON. In a case where the system control unit 108 determines that the processing in steps S606 and S613 is completed (YES in step S615), the processing skips step S616 and proceeds to step S617. On the other hand, in a case where the system control unit 108 determines that the processing in steps S606 and S613 is not completed (NO in step S615), the processing proceeds to step S616.

In step S616, the system control unit 108 controls the external output unit 115 to reduce the display image data stored in the RAM 111 to arrange the belt-like areas. More specifically, in step S616, the system control unit 108 performs processing for reducing the display image data to display the image 902. Since step S616 is performed regardless of whether the desqueeze display is ON or OFF, reduced images include the display image data 203 and 704 on which the desqueeze processing has been performed.

Figure 9B:
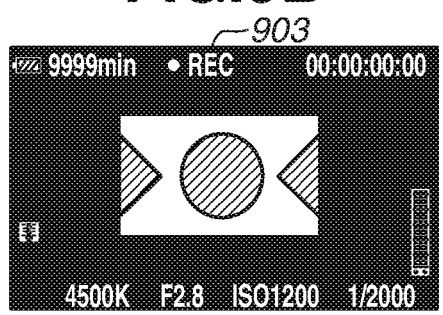

In a case where the system control unit 108 determines that the desqueeze flag is ON (YES in S615), the system control unit 108 displays an image 903 illustrated in FIG. 9B without reducing the display image data 401 even with the frame display is ON (the frame display setting is ON). More specifically, in a case where the desqueeze flag is ON, the image 903 is displayed regardless of whether the frame display is ON or OFF.

By not reducing the image even with the frame display is ON, the display image data is not reduced more than necessary, and therefore image visibility can be ensured.

In a case where either one of the recording resolution and the imaging frame rate satisfies a predetermined condition, the system control unit 108 may make the YES determination in step S615 and may not reduce the image. In a case of large recording resolution, when display image data is generated based on the image data 202 in the YUV format, writing of display data may not be completed because of a large amount of data on each line. Therefore, even in a case where a frame rate is not great, the system control unit 108 performs the scaling processing (down-conversion) on the image data 202 in the YUV format to downsize in both the vertical and the horizontal directions, and then displays the image data 202. More specifically, down-conversion may be necessary even with the 8K image resolution and the 30-p frame rate, instead of the 4K image resolution and the 60-p frame rate. With a recording resolution of 8K or higher, the down-conversion is required to constantly display a live view image on time. In this case, even in a case where the frame display is OFF, the system control unit 108 does not reduce the image for frame display since black belt areas are arranged around the displayed image.

Likewise, when the frame rate is greater than or equal to a predetermined frame rate, writing of one-line data may not be completed within predetermined time even in a case where display image data is generated in short time and recording resolution is low. Therefore, in this case, the system control unit 108 performs scaling (down-conversion) on the image data 202 in the YUV format to downsize in both the vertical and the horizontal directions, and displays the image data 202. When the image is displayed after the down-conversion, areas for displaying information are arranged around the image. Therefore, black belt areas for displaying information are arranged regardless of whether the frame display is ON of OFF. Consequently, even in a case where the frame display is OFF, the system control unit 108 does not reduce the image since areas for displaying information around the displayed image (so that the information is not superimposed on the image) have already arranged. While the above-described areas for displaying information are black belts, the areas are not limited thereto, and may be belts of while or other colors.

In step S617, the system control unit 108 controls the external output unit 115 to superimpose OSD data (information) on the display image data stored in the RAM 111 and output the resultant image data to the outside, to perform the image display on the display unit 115a.

Display examples in a case where a magnification function (Magn) is used will be described below with reference to FIGS. 9C and 9D. Images 904 and 905 illustrated in FIG. 9C indicate display examples in a case where the desqueeze display is ON and the magnification function for focus confirmation is performed.

Figure 9C:
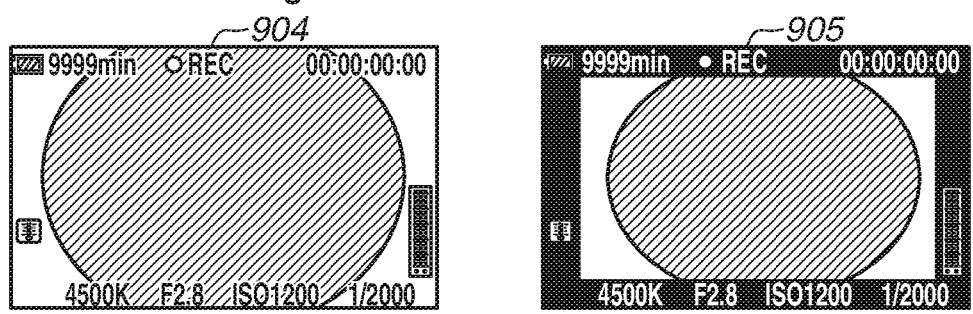
Figure 9D:
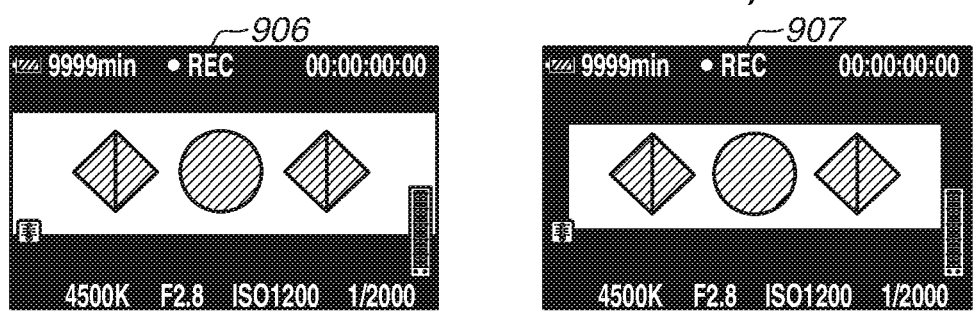

When the magnification function according to the present exemplary embodiment is enabled, the image 904 is displayed on the entire screen as illustrated in FIG. 9C even in the variable frame rate mode. Therefore, in a case where the frame display is ON, the system control unit 108 displays the reduced image 905.

While, in the present exemplary embodiment, the system control unit 108 performs the side black processing in step S613, the side black processing does not necessarily need to be performed. In this case, an image 906 illustrated in FIG. 9D is displayed. In this display, no image is displayed in the areas of the upper and lower sides of the display unit 115a, and part of information are superimposed on the right- and the left-hand sides. Therefore, in a case where the frame display is ON, the system control unit 108 displays an image 907 in a state in which it is reduced in comparison with the image 906. In a case where information is displayed only on the upper and lower sides, the system control unit 108 does not need to reduce the image. Similar to the descriptions of the images 904 and 905, in a case where the display image data and the OSD data are overlapped, the system control unit 108 further reduces the display image data in a case where the frame display is ON in comparison with the case of the frame display is OFF.

According to the above-described exemplary embodiment, even in a case where the user captures a moving image with a variable frame rate by using an anamorphic lens, the system control unit 108 can display a desqueezed image during recording of the moving image. In a case where the frame display is ON in the variable frame rate mode, the system control unit 108 can perform frame display without degrading the image visibility since the image is not reduced. On the other hand, in normal image capturing (not in the variable frame rate mode), the system control unit 108 reduces the image to provide areas for displaying information. In normal image capturing, since the image is displayed according to the screen size, the image visibility is not significantly degraded even in a case where the image is reduced to a certain extent. Therefore, both the image visibility and the information display visibility are achieved.

The above-described various control described to be performed by the system control unit 108 may be performed by one hardware component, and the entire apparatus may be controlled by a plurality of hardware components which share processing.

While the disclosure has specifically been described based on preferred exemplary embodiments, the disclosure is not limited to these specific exemplary embodiments. Diverse embodiments not departing from the spirit and scope of the disclosure are also included in the disclosure. Each of the above-described exemplary embodiments is to be considered as an exemplary embodiment of the disclosure. These exemplary embodiments can also be suitably combined.

The exemplary embodiments have been described above centering on a case where the disclosure is applied to the video camera 100. However, the disclosure is not limited to the exemplary embodiments but applicable to display control apparatuses capable of performing display control. More specifically, the disclosure is applicable to portable telephone terminals, portable image viewers, printer apparatuses having a finder, digital photo frames, music players, game machines, and electronic book readers.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The functions may include subroutines, modules, sub-programs, or units. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the disclosure, even in a case where a recording frame rate increases during moving image capturing using an anamorphic lens, a captured image can be displayed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-152799, filed on Aug. 23, 2019 which is hereby incorporated by reference herein in its entirety.

What is claimed is:

1. A display control apparatus comprising:
   an acquisition unit configured to acquire first image data that represents a subject image formed at different magnifications in a horizontal direction and a vertical direction;
   a display control unit configured to perform first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without clipping the part of the first image data; and
   a control unit configured to control the display control unit to perform the second resizing in a case where a moving image recording setting satisfies a condition that a shooting mode in which a variable frame rate for moving image recording is set, and to perform the first resizing in a case where the moving image recording setting does not satisfy the condition.

2. A display control apparatus comprising:
   an acquisition unit configured to acquire first image data that represents a subject image formed at different magnifications in a horizontal direction and a vertical direction;
   a display control unit configured to perform first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without clipping the part of the first image data; and
   a control unit configured to control the display control unit to perform the second resizing in a case where a moving image recording setting satisfies a condition that a moving image resolution is greater than or equal to a predetermined value and to perform the first resizing in a case where the moving image recording setting does not satisfy the condition.

3. A display control apparatus comprising:
   an acquisition unit configured to acquire first image data that represents a subject image formed at different magnifications in a horizontal direction and a vertical direction;
   a display control unit configured to perform first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without clipping the part of the first image data; and a control unit configured to control the display control unit to perform the second resizing in a case where a moving image recording setting satisfies a condition that a frame rate for outputting a moving image is a predetermined value, and to perform the first resizing in a case where the moving image recording setting does not satisfy the condition.

4. The display control apparatus according to claim 1, wherein the first image data is obtained through an anamorphic lens, the first image data represents an image formed in a state where the horizontal direction of a subject is compressed further than the vertical direction of a subject.

5. The display control apparatus according to claim 4, wherein the display control unit performs the first resizing by applying a magnification ratio for the horizontal direction greater than a magnification ratio for the vertical direction.

6. The display control apparatus according to claim 1, wherein, in the first processing, the display control unit obtains the second image data by clipping a part including a central area of the first image data while removing a part of the first image data in the horizontal direction.

7. The display control apparatus according to claim 1, wherein, in the first resizing, the display control unit generates a display image having the predetermined aspect ratio by changing a magnification ratio in the horizontal direction of the second image data while not changing a magnification ratio in the vertical direction of the second image data.

8. The display control apparatus according to claim 1, wherein the control unit allows an image having the predetermined aspect ratio to be displayed, by arranging belt-like display on an image obtained by the second resizing.

9. The display control apparatus according to claim 1, wherein, in the second resizing, the control unit controls the display control unit to compress the first image data in the vertical direction without compressing the first image data in the horizontal direction.

10. The display control apparatus according to claim 1, wherein, in the first resizing, the control unit controls the display control unit to apply a magnification ratio in the horizontal direction of the second image data is twice a magnification ratio in the vertical direction.

11. The display control apparatus according to claim 1, wherein, in the second resizing, the control unit controls the display control unit to apply a reduction of the first image in the vertical direction.

12. The display control apparatus according to claim 1, further comprising a recording unit configured to resize the first image data for use in recording and record the resized first image data.

13. A method for controlling a display control apparatus, the method comprising:

acquiring first image data on a subject image formed at different magnifications in a horizontal direction and a vertical direction;

resizing the first image data, wherein the resizing can comprise first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without applying the first process; and controlling the resizing so that the first resizing is performed in a case where a moving image recording setting satisfies a condition that a shooting mode in which a variable frame rate for moving image recording is set, and the second resizing is performed in a case where the moving image recording setting does not satisfy the condition.

14. A non-transitory computer-readable storage medium storing a program for causing a computer of a display control apparatus to function as:

an acquisition unit configured to acquire first image data that represents a subject image formed at different magnifications in a horizontal direction and a vertical direction;

a display control unit configured to perform first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without clipping the part of the first image data; and a control unit configured to control the display control unit to perform the second resizing in a case where a moving image recording setting satisfies a condition that a shooting mode in which a variable frame rate for moving image recording is set, and to perform the first resizing in a case where the moving image recording setting does not satisfy the condition.

15. A method for controlling a display control apparatus, the method comprising:

acquiring first image data on a subject image formed at different magnifications in a horizontal direction and a vertical direction;

resizing the first image data, wherein the resizing can comprise first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without applying the first process; and controlling the resizing so that the first resizing is performed in a case where a moving image recording setting satisfies a condition that a moving image resolution is greater than or equal to a predetermined value, and the second resizing is performed in a case where the moving image recording setting does not satisfy the condition.

16. A non-transitory computer-readable storage medium storing a program for causing a computer of a display control apparatus to function as:

an acquisition unit configured to acquire first image data that represents a subject image formed at different magnifications in a horizontal direction and a vertical direction;

a display control unit configured to perform first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without clipping the part of the first image data; and a control unit configured to control the display control unit to perform the second resizing in a case where a moving image recording setting satisfies a condition that a moving image resolution is greater than or equal to a predetermined value, and to perform the first resizing in a case where the moving image recording setting does not satisfy the condition.

17. A method for controlling a display control apparatus, the method comprising:
   acquiring first image data on a subject image formed at different magnifications in a horizontal direction and a vertical direction;
   resizing the first image data, wherein the resizing can comprise first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without applying the first process; and
   controlling the resizing so that the first resizing is performed in a case where a moving image recording setting satisfies a condition that a frame rate for outputting a moving image is a predetermined value, and to perform the first resizing in a case where the moving image recording setting does not satisfy the condition.

18. A non-transitory computer-readable storage medium storing a program for causing a computer of a display control apparatus to function as:
   an acquisition unit configured to acquire first image data that represents a subject image formed at different magnifications in a horizontal direction and a vertical direction;
   a display control unit configured to perform first resizing and second resizing, wherein the first resizing comprises applying a first process to obtain second image data by clipping a part of the first image data and further comprises generating a display image having a predetermined aspect ratio from the second image data, and wherein the second resizing comprises resizing the first image data without clipping the part of the first image data; and
   a control unit configured to control the display control unit to perform the second resizing in a case where a moving image recording setting satisfies a condition that a frame rate for outputting a moving image is a predetermined value, and to perform the first resizing in a case where the moving image recording setting does not satisfy the condition.

* * * * *